United States Patent [19]

Norman

[11] 4,237,920
[45] Dec. 9, 1980

[54] SPRING LOADED PLUG VALVE

[75] Inventor: Arthur E. Norman, Northridge, Calif.

[73] Assignee: Torr Vacuum Products, Inc., Van Nuys, Calif.

[21] Appl. No.: 7,332

[22] Filed: Jan. 29, 1979

[51] Int. Cl.³ .................. F16K 31/122; F16K 31/44
[52] U.S. Cl. ........................ 137/243.3; 92/84; 251/63.4; 251/77; 251/87; 251/335 B
[58] Field of Search ............... 137/242, 243.3; 251/63.4, 63.5, 63.6, 84, 86, 87, 88, 330, 335 B, 77, 368; 92/84, 129, 130 A

[56] References Cited

U.S. PATENT DOCUMENTS

| | | | |
|---|---|---|---|
| 1,296,897 | 3/1919 | Yeomans | 137/243.3 |
| 1,799,667 | 4/1931 | Ziegler | 251/87 |
| 2,213,998 | 9/1940 | Sifkovitz | 137/242 |
| 2,694,547 | 11/1954 | MacGregor | 251/330 |
| 2,707,378 | 5/1955 | Ryan | 251/63.4 |
| 2,872,149 | 2/1959 | Batley et al. | 92/84 |
| 2,910,088 | 10/1959 | Natho | 92/129 |
| 3,084,901 | 4/1963 | Thorburn | 251/335 B |
| 3,175,473 | 3/1965 | Boteler et al. | 92/130 A |
| 3,257,095 | 6/1966 | Siver | 251/330 |
| 3,424,062 | 1/1969 | Gummer et al. | 92/129 |
| 3,434,691 | 3/1969 | Hamilton | 251/368 |
| 3,744,751 | 7/1973 | Robinson | 251/335 B |
| 3,958,592 | 5/1976 | Wells et al. | 251/63.6 |

FOREIGN PATENT DOCUMENTS 1234306 10/1960 France .................... 251/335 B
1373815 11/1974 United Kingdom .......... 251/61.4

Primary Examiner—Martin P. Schwadron
Assistant Examiner—G. L. Walton
Attorney, Agent, or Firm—Keith D. Beecher

[57] ABSTRACT

A valve is provided which includes a poppet enclosed in a plug of plastic material, such as Teflon, and which is biased against a seat by a compression spring so that a positive seal is provided even in the presence of cold flow in the plastic plug. A valve stem engages the poppet, and it serves to pull the poppet and plug away from the seat against the force of the spring when the valve is opened, and to force the poppet and plug against the seat when the valve is closed. The valve is closed by a pressurized fluid, such as air, and is opened by means of a spring when the air pressure is removed. The Teflon plug is provided with a sharp corner which contacts a conical seat creating a seal when the valve is closed. The sharp corner of the plug wipes the seat of the debris as the valve is opened and closed.

7 Claims, 2 Drawing Figures

SPRING LOADED PLUG VALVE

RELATED APPLICATIONS

Copending application Ser. No. 959,940 filed for Arthur E. Norman on Nov. 13, 1978.

BACKGROUND

As described in the copending application, valves for use with vacuum equipment are essentially different from valves used in conventional systems whose objective is to control the flow of a liquid or gas. In such conventional systems, some leakage of the liquid or gas can usually be tolerated. In the case of vacuum valves, however, even the slightest leak involves not only the loss of a liquid or gas, but total destruction of the vacuum in the vacuum equipment controlled thereby. Therefore, no leakage can be tolerated in vacuum valves.

The valve of the present invention, like the valve of the copending application, is intended primarily for use as a vacuum valve in which even the smallest leaks cannot be tolerated. A positive sealing action is assured in the assembly of the present invention when the valve is closed, this being achieved by the use of a Teflon plug which engages a seat in the valve in a leak-free sealing relationship, as will be described. Like the valve of the copending application, the Teflon plug in the present instance is forced against the valve seat by the stem of the valve when the valve is closed. In addition, a compression spring engages the plug, so that the plug is held in its sealed condition, even in the presence of cold flow of the plastic material. In the valve of the present invention the Teflon plug is shaped to perform a scraping action on the seat when the valve is opened or closed to keep the seat free of debris.

DETAILED DESCRIPTION OF THE ILLUSTRATED EMBODIMENT

Figure 1:
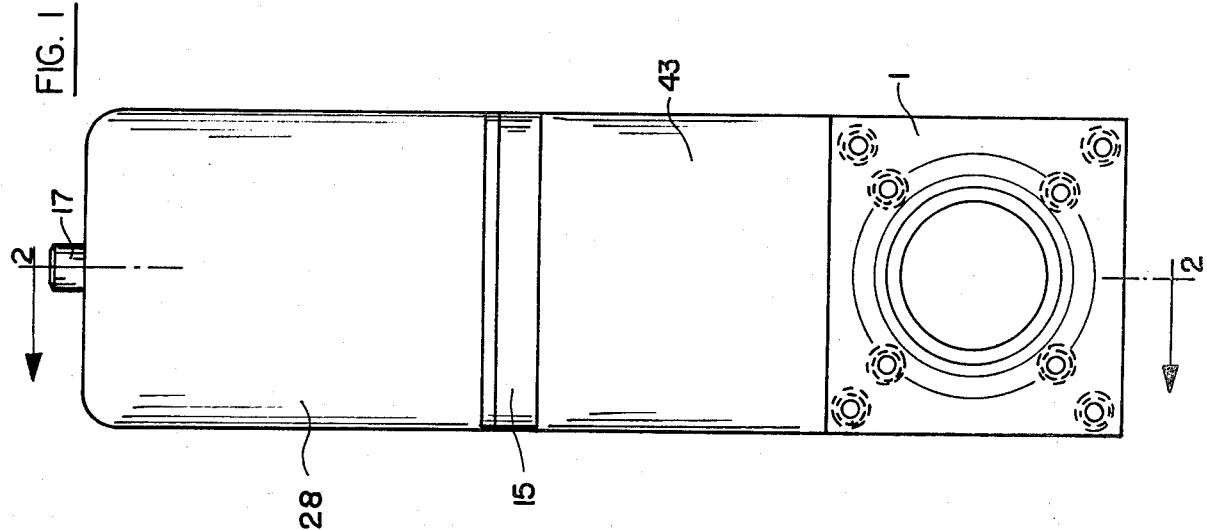
FIG. 1 is an elevational view of a spring biased plug valve constructed in accordance with one embodiment of the invention.
Figure 2:
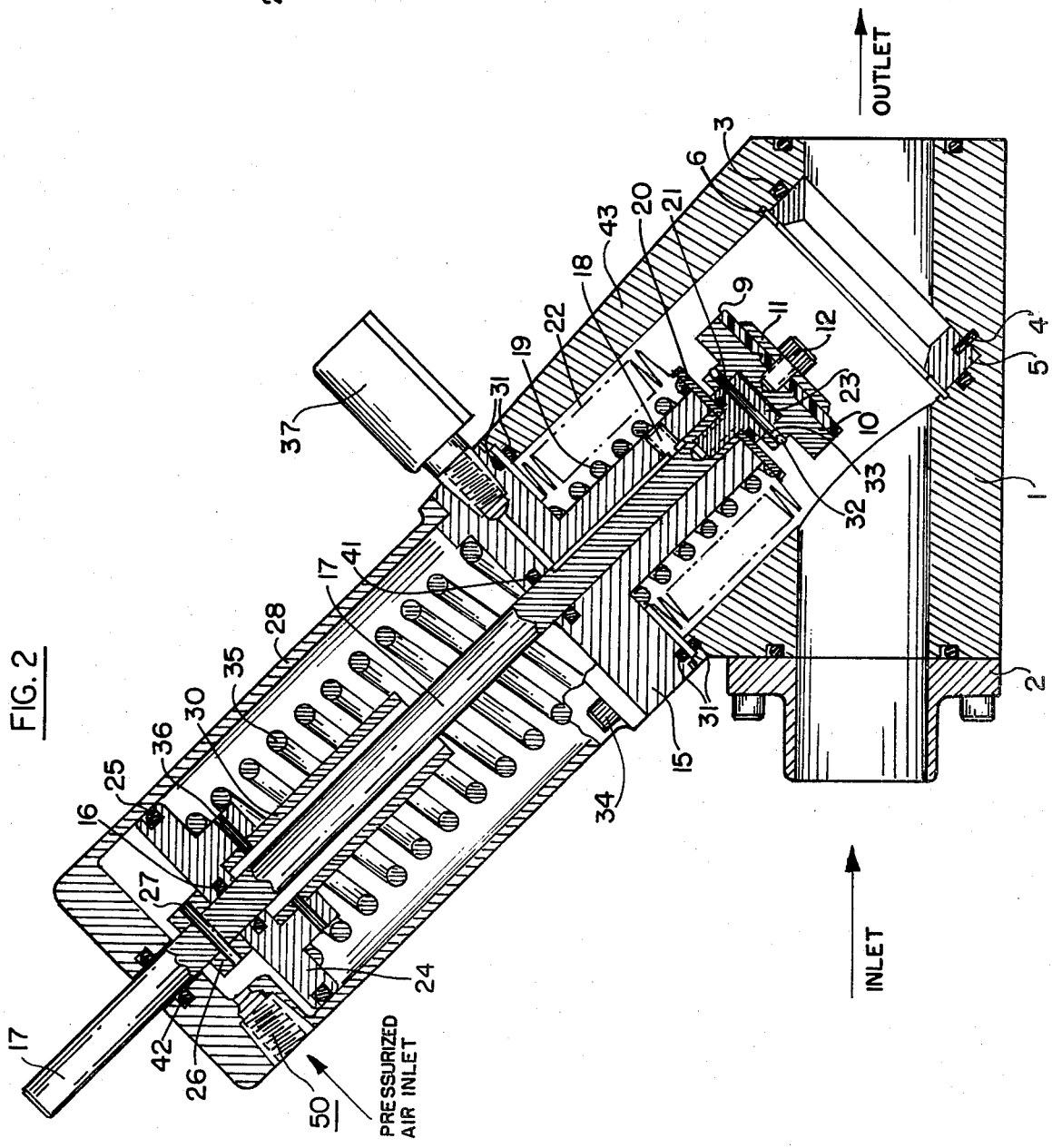
FIG. 2 is a sectional view of the valve of FIG. 1 taken essentially along the line 2—2 of FIG. 1.

The valve assembly shown in FIGS. 1 and 2 includes a cylinder 43 which is welded, or otherwise attached to a tube 1. The tube 1 constitutes the valve body, and it includes a flange 2 secured to one end forming the inlet to the valve, and a similar flange (not shown) secured to the other end of the tube, and constituting the outlet. The cylinder 43 is welded to the tube at an inclination, as shown. A cylinder head 15 is attached to one end of the cylinder 43, and the cylinder head also forms a guide bushing, as will be described. Appropriate seals 31 are provided between the cylinder head and the cylinder. A valve seat 5 is attached to the other end of the cylinder, and the seat has a tapered conical seating surface, which may have an angle, for example, of 60° to the plane of the seat. The seat is held in place in the end of the cylinder by means of a snap ring 6, and a pin 4. The seat is sealed to the cylinder by a seal 3.

A pneumatic cylinder 28 is secured to the upper end of cylinder 43. A piston rod 17 extends down through the pneumatic cylinder in coaxial relationship with the pneumatic cylinder, and with cylinder 43. The piston rod 17 extends through the cylinder head and guide bushing 15, and is sealed thereby to means of an appropriate O-ring seal 41. The piston rod is reciprocally movable along the longitudinal axis of cylinder 28. A piston 24 is slidable on the piston rod 17, and it is sealed to the rod by an O-ring seal 16. The piston is sealed to the bore surface of the pneumatic cylinder 28 by an O-ring 25. A spring 35 within the pneumatic cylinder 28 biases the piston 25 against a stop 26 which is attached to the piston 17 by means of a pin 27. The piston 17 extends out through the end of the pneumatic cylinder 28, and is sealed to the cylinder by an O-ring 42.

A further stop 30 is secured to the piston 24 by means of a pin 36. When pressurized air is introduced into the pneumatic cylinder through an inlet 50 at the upper end of the cylinder, the piston 24 is forced against the bias of spring 35 downwardly in the pneumatic cylinder until stop 30 engages the top surface of cylinder head 15.

A poppet valve 10 is secured to a shaft 23 by means of a pin 33. Shaft 23 is threaded into the end of piston rod 17, and is sealed to the piston rod by means of a seal 21. A Teflon disc 9 is mounted on the outer face of the poppet 10 as a seal, and the disc has a sharp corner, as shown. The Teflon disc 9 is supported on the poppet by means of a retaining washer 11 and screw 12, the screw being threaded into the poppet.

A bellows assembly 20, 22 surrounds the guide bushing portion of cylinder head 15. A spring 19 is mounted coaxially about the guide bushing within the bellows, and biases the poppet 10 down toward the seat 5.

To close the valve, compressed air is introduced into the pneumatic cylinder 28 through the inlet 50, causing the piston 24 to move towards the lower end of the pneumatic cylinder compressing spring 35 until stop 30 rests upon the cylinder head 15. The piston is sealed to the cylinder by the O-ring 25, and it is sealed to the piston rod 17 by O-ring 16. The piston is free to slide on and to move independently of the piston rod 17. Spring 19 biases the poppet assembly 9, 11 and 12 in a direction to cause the Teflon disc 9 to engage the tapered seat 5 in a sealing relationship therewith. This action occurs when the pneumatic pressure within the pneumatic cylinder 28 frees the piston rod 17 from the overriding force of spring 35 which, in the absence of pneumatic pressure within the pneumatic cylinder, biases the piston 24 against the stop 26, which is pinned to the piston rod.

Poppet 10 is loosely connected to the drive shaft 23 through pin 33 allowing 2° of freedom for alignment of the Teflon disc 9 in seat 5. As stated above, shaft 23 is attached by threading to the drive piston rod 17, capturing the bellow assembly 20 and 22 inbetween. The bellows assembly is used to seal the poppet assembly from atmospheric leakage from outside of the valve. Spring 19 is used not only to close the valve when the piston rod is released by exerting a force between the Teflon disc 9 and the tapered seat 5, but it is also used to produce a constant load compensating for cold flow of the Teflon.

Pin 18 is screwed into the guide bushing 15 and engages a slot in piston rod 17, thus prohibiting torsional twist of the piston rod or bellows assembly. A vacuum gage 37 is used to monitor the volume between bellows 22 and O-ring piston rod seal 41, thus providing an indication of leakage due to failure of the bellows. Seat 5 is removable to provide for maintenance of its sealing surface, and it is sealed to body 1 by the use of O-ring 3. The seal is held against rotation by pin 4.

In order to open the valve, it is merely necessary to release the pressure from the pneumatic cylinder 28. When that occurs, spring 35 overcomes spring 19, and moves piston 24 against the piston rod stop 26 attached to piston 17, thereby opening the valve.

As stated above, the Teflon sealing disc 9 is shaped to have a sharp corner which scrapes across the surface of seat 5, thus maintaining the surface free from accumulated debris.

The invention provides, therefore, a simple plug-type valve which, in the illustrated embodiment is pneumatically operated, and which is particularly adapted for vacuum application.

It will be appreciated that although a particular embodiment of the invention has been shown and described, modifications may be made. It is intended in the following claims to cover all the embodiments which come within the spirit and scope of the invention.

What is claimed is:

1. A valve assembly including: a housing defining an inlet and an outlet, and further defining a seat positioned within the housing between the inlet and the outlet; a poppet valve mounted in the housing and movable between an open position displaced from said seat and a closed position; a plastic plug member secured to said poppet valve for engaging said seat in sealed relationship therewith when the poppet valve is closed; a piston rod reciprocally movable in said housing; means coupling one end of said piston rod to said poppet valve; a piston slidable on said piston rod; a stop mounted on said piston rod; first resilient means biasing said piston against said stop for moving said piston rod to a first position in said housing and for moving said poppet valve to its open position; means for introducing a pressurized fluid into said housing to move said piston along said piston rod against the bias of said first resilient means and away from said stop to release said piston rod; and second resilient means for moving said piston rod from said first position independently of said piston rod for forcing said poppet valve to its closed position when said piston rod is released and for maintaining a positive force on said poppet valve in its closed position in the presence of any deformation thereof.

2. The valve assembly defined in claim 1, in which said coupling means coupling said one end of said piston rod to said poppet valve includes a pivot pin for loosely coupling the poppet valve to the piston while allowing substantially 2° of freedom to the poppet valve for alignment with the seat.

3. The valve assembly defined in claim 1, in which said seat has a tapered surface, and said plastic plug member is configured to have an edge positioned to scrape the tapered surface of the seat as the poppet valve is opened and closed.

4. The valve assembly defined in claim 3, in which said plastic material is Teflon.

5. The valve assembly defined in claim 1, in which said housing includes first cylinder means for housing the poppet valve and the second resilient means, and second pneumatic cylinder means coaxial with said first cylinder means for housing the piston and the first resilient means; and in which the introducing means introduces the pressurized fluid into the first cylinder.

6. The valve assembly defined in claim 1, and which includes a further stop mounted on said piston for limiting the movement of the piston by the pressurized fluid.

7. The valve assembly defined in claim 5, and which includes a bellows mounted in said second cylinder coaxially around said piston to seal the interior of the second cylinder from external pressure.

* * * * *